United States Patent [19]

Smith

[11] Patent Number: 4,781,759

[45] Date of Patent: Nov. 1, 1988

[54] LIMESTONE AND CLAY TRACTION AID

[76] Inventor: George N. Smith, 3833-N. Lake Orlando Pkwy., Orlando, Fla. 32808

[21] Appl. No.: 763,946

[22] Filed: Aug. 8, 1985

[51] Int. Cl.$^4$ ............................................. C09K 3/18
[52] U.S. Cl. ................................... 106/36; 501/141; 252/70; 502/80; 106/13
[58] Field of Search ..................... 501/141; 252/70; 502/80; 106/13, 36

[56] References Cited

U.S. PATENT DOCUMENTS

| | | | |
|---|---|---|---|
| 2,597,457 | 5/1952 | Cook | 119/1 |
| 3,921,581 | 11/1925 | Brewer | 119/1 |
| 4,108,669 | 8/1978 | Otrhalek et al. | 106/13 |
| 4,243,415 | 1/1981 | Lowe, Jr. | 106/13 |
| 4,430,242 | 2/1984 | Ganey | 252/70 |

FOREIGN PATENT DOCUMENTS

| | | | |
|---|---|---|---|
| 3141644 | 5/1983 | Fed. Rep. of Germany | 252/70 |
| 3148417 | 7/1983 | Fed. Rep. of Germany | 252/70 |
| 111532 | 8/1979 | Japan | 106/13 |
| 219399 | 12/1983 | Japan | 252/70 |
| 993979 | 6/1965 | United Kingdom | 502/80 |

*Primary Examiner*—William R. Dixon, Jr.
*Assistant Examiner*—Ann Knab
*Attorney, Agent, or Firm*—Willian Brinks Olds Hofer Gilson & Lione Ltd.

[57] ABSTRACT

A traction aid for snow and ice covered surfaces and method of use are disclosed. The preferred traction aid composition for highways comprises about 90% by weight of between ¼ inch and 30 mesh hard, crushed limestone and about 10% by weight of 6/30 mesh heat treated ground clay. The preferred composition for sidewalks comprises about 80% by weight 4/30 mesh hard, crushed limestone and about 20% by weight of 6/30 mesh heat treated ground clay.

11 Claims, No Drawings

LIMESTONE AND CLAY TRACTION AID

BACKGROUND OF THE INVENTION

The present invention relates generally to compositions comprising limestone and clay, and more particularly to such compositions which are used as a traction aid for streets and sidewalks when covered with ice or snow.

Various materials have been used in the past to improve traction on otherwise slippery surfaces. It has been particularly important to use such materials to improve traction on streets and sidewalks when covered with ice or snow. A common material for this use has been sand. During ice or snow conditions, it has been a common practice to spread sand over streets by truck or over sidewalks by hand to thereby mechanically improve traction by providing the surface with increased roughness. However, one problem with using sand for this purpose has been its relatively small particle size. That is, because the grains of sand are so small, they are more readily compacted into the ice or snow to the extent that they no longer project above the surface of the ice or snow whereby their traction enhancement is lost. This small particle size also allows the sand to be more easily blown by wind off of the surface to which it was applied. Another problem with using sand has been its relatively high density. Because sand is so dense, it takes a relatively large weight of it to cover a certain surface area.

Another type of material which has been commonly used is inorganic salt. such as sodium chloride or calcium chloride. These salts. which have been applied in the same way as sand, have been particularly useful because of the effect they have in melting the ice or snow. Salts have therefore become widely used by street departments and homeowners alike. However, certain problems and limitation exist with using salt. The most serious problem is the harmful effects the salt has on the environment. It is well-known that salt applied to the road causes cars to rust at a faster rate. In addition, the salt causes increased rusting of the reinforcing and other structural steel used in highway construction. Also, because the salt is so highly water soluble, it is rather mobile and is washed into the adjacent fields and eventually into the area's entire water system thereby creating serious problems for people, plants and animals.

Another drawback of using salt for traction enhancement is the fact that its effectiveness is pretty much limited to its chemical action of melting the ice or snow. That is, the salt does not provide much mechanical traction enhancement because it is so easily dissolved in water and so easily crushed. Yet another limitation of using salt is the fact that below a certain temperature, it will not melt ice or snow, causing a freeze-thaw cycle that further erodes porous road surfaces through a process known as spalling.

SUMMARY OF THE INVENTION

The present invention is a traction aid comprising crushed limestone and ground clay as well as the use of the crushed limestone and ground clay composition for a traction aid.

In accordance with one embodiment which is preferred for use on streets and highways, the composition comprises about 90 percent by weight of between ¼ inch and 30 mesh hard, angularly cut limestone and about 10 percent by weight of 6/30 mesh heat treated ground clay.

In accordance with another embodiment which is preferred for use on sidewalks, the composition comprises about 80 percent by weight 4/30 mesh hard, sharply cut limestone and about 20 percent by weight of 6/30 mesh heat treated ground clay.

One advantage of the present invention involves the fact that this limestone and clay composition is environmentally compatible. That is, the two components are not harmful to the road or sidewalk surfaces to which they are applied. In addition, they do not harm the water table, soil, plant, or animal life adjacent to the covered surfaces. In fact, the clay particles help retain moisture and provide aeration to the soil, while the limestone adds calcium to the soil and neutralizes acidic soil conditions.

Another advantage is that the limestone particles are hard, and last a long time when being driven upon. Also, limestone can be obtained in larger sizes than the sand used previously. In this way, the present invention offers greater traction enhancement.

Still another advantage of the present invention involves the fact that limestone by itself has the tendency to freeze together and form clumps during cold weather thereby making application difficult. The inclusion of the ground clay according to the present invention has been found to alleviate this problem.

Yet another advantage of the present invention is that the addition of the clay to the crushed limestone lowers the bulk density of the composition. As a result, a lower weight of the composition is needed to cover the same surface area. This is particularly important to highway departments which must cover as much surface area as possible in as short a time as possible when hit by a snowstorm.

Still yet another advantage of the present invention is that the effectiveness as a traction aid of the limestone and clay composition is not dependent on temperatures. As a result, it can be used at temperatures below which salt loses its effectiveness. Also, the use of clay in the composition helps to prevent refreezing because the water from melted snow and ice is absorbed by the clay.

DETAILED DESCRIPTION

Limestone and dolomite are common minerals naturally occurring together, though in varying relative concentrations. Limestone is primarily calcium carbonate ($CaCO_3$) and dolomite is primarily calcium magnesium carbonate ($CaMg(CO_3)_2$). When large amounts of both minerals occur naturally mixed together. the material may be referred to as dolomitic limestone. Processing of these minerals includes mining, crushing and sizing. As used herein, the term crushed limestone refers to limestone, dolomitic limestone or dolomite in a processed state.

It is preferable in the present invention that the limestone be hard and sharply cut, meaning that all of the particles of limestone have been crushed during processing. The benefit of this is that all of the limestone particles are thereby fractured to produce angular particles. By their shape, these angular particles are better suited for enhancing traction than rounded particles would be.

Ground clay is a generic term which describes numerous types of clays that are processed and have common absorbent properties. These clays include, but are not limited to Montmorillonite, Attapulgite, Bentonite, Porter's Creek clay, and Fullers Earth. Each type of clay has a slightly different composition. Also, clay composition will vary between and within deposits of the same type. Any absorbent ground clay can be used in the composition of the present invention.

Clay is generally processed by mining, drying, crushing and particle sizing. As used herein, ground dried clay refers to clay which has been subjected to normal drying conditions, usually in the range of 300 to 700° F. Preferably, the ground clay used in the composition of this invention is also heat treated in order to further dry and harden the clay. The term heat treated clay as used herein refers to ground clay which has been subjected to higher temperatures than those used for normal drying operations. Such higher temperatures are in the range of 800° to 1800° F. and are used for the purpose of hardening the clay.

Although either ground dried clay or heat treated clay may be used in the present invention, heat treated clay is definitely preferred because of its increased hardness. In particular, the heat treated clay's increased hardness helps prevent the clay particles from being crushed during use on a street or sidewalk. This is important in preventing the clay from forming a slurry which would be detrimental to traction.

One disadvantage of using crushed limestone by itself as a winter traction aid is that limestone particles have the tendency to freeze and form clumps at low temperatures. In particular, crushed limestone will generally adsorb water on its surface. When this water freezes, the particles of limestone can become frozen together thereby making limestone gravel difficult to apply during cold weather conditions, especially by truck. However, it has been found that when a quantity of ground clay is added to the crushed limestone, the crushed limestone resists being frozen together. In particular, it has been found that when an amount of ground clay is added, crushed limestone could be applied in cold weather without clumping together.

An important parameter of the present invention is the relative amounts of crushed limestone and ground clay in the traction aid composition. It has been found that if there is too much ground clay in the composition, the clay can be too easily crushed and made into a slurry. As mentioned above, this slurry is detrimental to traction. Also, if there is not enough clay, the limestone is not kept sufficiently dry to prevent clumping. The preferred composition for use on sidewalks and driveways includes 80 percent by weight crushed limestone with 20 percent by weight ground clay. For use on streets and highways it has been found preferable to include 90 percent by weight crushed limestone with 10 percent by weight ground clay. The higher weight percent of limestone for use on streets and highways is considered preferable because of the higher forces to which the composition will be subjected, limestone being relatively hard and long lasting.

Another important parameter of the traction aid composition is the particle sizes of the limestone and the ground clay. In particular, it is important to include the particles of crushed limestone and ground clay in the proper sizes in order to perform their different functions. Also, it has been found that it is most preferable to vary the particle sizes depending on the use to which the traction aid is to be put.

For use on streets and highways, the particle size for the crushed limestone is preferably between $\frac{1}{4}$ inch and 30 mesh, and most preferably about $\frac{1}{4}$ inch. The term $\frac{1}{4}$ inch refers to limestone particles which pass through a $\frac{1}{4}$ inch hole in a screen. The term 30 mesh means that none of the limestone particles will pass through a Number 30 sieve. (All sieve and mesh sizes are given in ASTME-11 Specification Standard U.S. Testing Sieve sizes.) This relatively large size for the crushed limestone particles has been found to be most efficient in increasing traction on ice or snow. The preferred size for the ground clay when used on streets and highways is 6/30 mesh, meaning the clay particles will pass through a Number 6 but not a Number 30 mesh. This size for the ground clay is considered preferable based on factors of available surface area for water absorption as well as particle strength in order to avoid the clay particles being too readily crushed.

For use on sidewalks and driveways, the preferred particle size for the crushed limestone is 4/30 mesh. This smaller particle size is desirable in order to allow people to walk on the traction aid without difficulty. The preferred particle size for the ground clay when used on sidewalks and driveways is 6/30 for the reasons given above.

The present invention can of course also be used in conjunction with salt, though to do so will mean that the detrimental effects of salt will only be lessened rather than avoided. When the composition of the present invention includes salt, the clay is useful to absorb the water-salt solution which is produced by melting snow or ice. This means that less salt is available to corrode automobiles and hurt the environment. Also, if the snow and ice melted by the salt refreezes, the clay and limestone of the present invention will provide increased traction by being captured in the refreezing ice.

The composition of the present invention may be used by spreading it on snow and ice covered surfaces in a conventional manner, by hand, machine or truck.

It should be noted that the present invention has been described in detail for purposes of illustration and explanation, and is not limited thereby, but is defined in the following claims.

What is claimed is:

1. A process for providing traction on ice or snow comprising the steps of:
    (a) providing a composition comprising 75 to 95 percent by weight crushed limestone having a particle size between about $\frac{1}{4}$ inch and about 30 mesh and 5 to 25 percent ground clay and
    (b) spreading the composition on ice or snow covered surfaces.

2. The invention of claim 1 wherein the ground clay is heat treated clay which has been subjected to temperatures in the range of 800° to 1800° F.

3. The invention of claim 1 further comprising an inorganic salt.

4. A process for providing traction on ice or snow covered streets or highways comprising the steps of:
    (a) providing a composition comprising about 90 percent by weight of crushed limestone having a particle size of between about $\frac{1}{4}$ inch and about 30 mesh and about 10 percent by weight of heat treated ground clay and
    (b) spreading the composition on said ice or snow covered streets or highways.

5. The invention of claim 4 wherein the ground clay has a particle size of 6/30 mesh.

6. The invention of claim 5 wherein the limestone is dolomitic limestone.

7. The invention of claim 5 wherein the ground clay is Montmorillonite.

8. A process for providing traction on ice or snow covered sidewalks comprising the steps of:
   (a) providing a composition comprising about 80 percent by weight of crushed limestone having a particle size of 4/30 mesh and about 20 percent by weight of heat treated ground clay and
   (b) spreading the composition on said ice or snow covered sidewalks.

9. The invention of claim 8 wherein the ground clay has a particle size of 6/30 mesh.

10. The invention of claim 9 wherein the crushed limestone is dolomitic limestone.

11. The invention of claim 9 wherein the ground clay is Montmorillonite.

* * * * *

UNITED STATES PATENT AND TRADEMARK OFFICE
CERTIFICATE OF CORRECTION

PATENT NO. : 4,781,759
DATED : November 1, 1988
INVENTOR(S) : George N. Smith

It is certified that error appears in the above-identified patent and that said Letters Patent is hereby corrected as shown below:

On the cover page under the heading "U.S. PATENT DOCUMENTS," after "3,921,581" please delete 11/1925 and substitute therefor --11/1975--.

In column 1, line 32, after "salt" please delete "." and substitute therefor --,--.

In column 1, line 33, after "salts" please delete "." and substitute therefor --,--.

In column 2, line 52, after "together" please delete "." and substitute therefor --,--.

Signed and Sealed this

Thirtieth Day of July, 1991

Attest:

HARRY F. MANBECK, JR.

*Attesting Officer*  *Commissioner of Patents and Trademarks*